US012571642B2

(12) United States Patent
Gupta et al.

(10) Patent No.: US 12,571,642 B2
(45) Date of Patent: Mar. 10, 2026

(54) SYSTEMS AND METHODS FOR INTERACTIVELY AND VIRTUALLY EXPLORING GEOGRAPHIC AREAS DURING VEHICLE TRAVEL

(71) Applicant: Toyota Motor Engineering & Manufacturing North America, Inc., Plano, TX (US)

(72) Inventors: Rohit Gupta, Santa Clara, CA (US); Benjamin Piya Austin, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 20 days.

(21) Appl. No.: 18/631,197

(22) Filed: Apr. 10, 2024

(65) Prior Publication Data

US 2025/0321116 A1 Oct. 16, 2025

(51) Int. Cl.
| | |
|---|---|
| *G01C 21/36* | (2006.01) |
| *B60K 35/23* | (2024.01) |
| *G06F 3/01* | (2006.01) |
| *G06T 19/00* | (2011.01) |

(52) U.S. Cl.
CPC .......... *G01C 21/3679* (2013.01); *B60K 35/23* (2024.01); *G06F 3/011* (2013.01); *G06T 19/006* (2013.01); *B60K 2360/166* (2024.01); *B60K 2360/177* (2024.01)

(58) Field of Classification Search
CPC ................ G01C 21/3679; B60K 35/23; B60K 2360/166; B60K 2360/177; G06F 3/011; G06T 19/006
See application file for complete search history.

(56) References Cited

U.S. PATENT DOCUMENTS

| | | | |
|---|---|---|---|
| 6,266,614 | B1 | 7/2001 | Alumbaugh |
| 6,845,321 | B1 | 1/2005 | Kerns |
| 7,647,166 | B1 | 1/2010 | Kerns |
| 8,121,784 | B2 | 2/2012 | Templeton et al. |
| 8,515,892 | B2 | 8/2013 | Spring |

(Continued)

FOREIGN PATENT DOCUMENTS

| | | |
|---|---|---|
| CN | 117017298 A | 11/2023 |
| JP | 2009019969 A | 1/2009 |

(Continued)

*Primary Examiner* — Kenneth M Dunne

(74) *Attorney, Agent, or Firm* — Christopher G. Darrow; Darrow Mustafa PC

(57) ABSTRACT

Systems, methods, and other embodiments described herein relate to generating audiovisual and virtual content that are interesting to occupants about a geographic area during vehicle travel using adaptive timing. In one embodiment, a method includes detecting features about an area surrounding a vehicle during vehicle travel using sensor data. The method also includes transitioning a mode for the vehicle using the features and occupant parameters. The method also includes generating audiovisual content and virtual information of a view within the area for the mode using a time sequence. The method also includes adapting an environment of the vehicle using the audiovisual content, the virtual information, and the occupant parameters.

20 Claims, 5 Drawing Sheets

(56)                References Cited

U.S. PATENT DOCUMENTS

| | | | |
|---|---|---|---|
| 8,566,348 B2 | 10/2013 | Rinearson et al. | |
| 8,838,382 B2 | 9/2014 | Drysdale | |
| 8,994,613 B1 | 3/2015 | Johnson et al. | |
| 9,100,402 B2 | 8/2015 | Lawler et al. | |
| 9,610,510 B2 | 4/2017 | Comploi | |
| 9,762,851 B1 | 9/2017 | Baumert et al. | |
| 9,830,044 B2 | 11/2017 | Brown et al. | |
| 9,918,199 B2 | 3/2018 | Rouda, Jr. | |
| 10,095,228 B1 * | 10/2018 | Kuffner, Jr. | B60K 35/40 |
| 10,136,260 B2 | 11/2018 | Parulski et al. | |
| 10,585,471 B2 * | 3/2020 | Reichow | G08G 1/096708 |
| 10,724,874 B2 | 7/2020 | Beaurepaire | |
| 10,866,562 B2 | 12/2020 | Kim | |
| 11,104,272 B2 | 8/2021 | Border et al. | |
| 11,107,282 B1 * | 8/2021 | Boissière | G06F 3/011 |
| 11,250,630 B2 | 2/2022 | Knipp et al. | |
| 11,310,624 B2 | 4/2022 | Mukherjee-Roy et al. | |
| 11,532,245 B2 | 12/2022 | Klappert et al. | |
| 11,617,941 B2 | 4/2023 | Zeng et al. | |
| 11,651,018 B2 | 5/2023 | Nissen | |
| 11,825,023 B2 | 11/2023 | Spohrer | |
| 2002/0019696 A1 | 2/2002 | Kruse | |
| 2005/0119903 A1 | 6/2005 | Lee | |
| 2008/0162042 A1 | 7/2008 | Huber et al. | |
| 2008/0319773 A1 | 12/2008 | Wong et al. | |
| 2010/0253542 A1 * | 10/2010 | Seder | G01S 13/931 |
| | | | 340/425.5 |
| 2016/0378861 A1 * | 12/2016 | Eledath | G06V 20/52 |
| | | | 707/766 |
| 2017/0329329 A1 | 11/2017 | Kamhi et al. | |
| 2018/0040162 A1 * | 2/2018 | Donnelly | G02B 27/0093 |
| 2018/0216956 A1 * | 8/2018 | Ritcherson | H04W 4/021 |
| 2020/0126276 A1 | 4/2020 | Rakshit et al. | |
| 2020/0189466 A1 | 6/2020 | Askeland | |
| 2020/0200556 A1 | 6/2020 | Boston et al. | |
| 2020/0379560 A1 | 12/2020 | Krasadakis | |
| 2021/0097893 A1 * | 4/2021 | Klappert | G06F 16/9024 |
| 2022/0074756 A1 | 3/2022 | Gewickey et al. | |
| 2022/0084256 A1 * | 3/2022 | Wan | G06T 7/73 |
| 2022/0165037 A1 * | 5/2022 | Zavesky | H04L 67/131 |
| 2022/0237429 A1 | 7/2022 | Lin et al. | |
| 2023/0090499 A1 | 3/2023 | Huet et al. | |
| 2023/0258466 A1 * | 8/2023 | Lee | B60K 35/28 |
| | | | 701/426 |
| 2023/0286532 A1 | 9/2023 | Gerrese et al. | |
| 2024/0005612 A1 * | 1/2024 | Yokokawa | G06V 40/161 |
| 2024/0185539 A1 * | 6/2024 | Piemonte | G06T 19/006 |
| 2024/0196026 A1 * | 6/2024 | Zink | H04N 21/234345 |

FOREIGN PATENT DOCUMENTS

| | | |
|---|---|---|
| JP | 2017111777 A | 6/2017 |
| JP | 2020067850 A | 4/2020 |

* cited by examiner

SYSTEMS AND METHODS FOR INTERACTIVELY AND VIRTUALLY EXPLORING GEOGRAPHIC AREAS DURING VEHICLE TRAVEL

TECHNICAL FIELD

The subject matter described herein relates, in general, to interactively exploring a geographic area during vehicle travel, and, more particularly, to generating audiovisual content about the geographic area using adaptive timing.

BACKGROUND

Vehicles can be equipped with sensors that generate data for perceiving other vehicles, obstacles, pedestrians, and additional aspects of a surrounding environment. For example, a vehicle may be equipped with a light detection and ranging (LIDAR) sensor that uses light to scan the surrounding environment. Meanwhile, logic associated with the LIDAR analyzes acquired data to detect object presence and other features of the surrounding environment. In further examples, cameras can be implemented to acquire information about the surrounding environment from which a system derives awareness about aspects of the surrounding environment. This sensor data can be useful in various circumstances for improving perceptions of the surrounding environment so that systems such as automated driving systems can accurately plan and navigate using perceived information. In one approach, vehicle systems factor information about surroundings for controlling modes. For example, a driving mode switches from an economy to a sporty mode when information about the surrounding environment indicates that the road has few obstacles, minimal traffic, and curvy areas.

In various implementations, the further awareness is developed by the vehicle about a surrounding environment, the better an operator can be supplemented with information to assist in driving and increase occupant enjoyment. However, systems encounter difficulties with informing operators about certain qualities associated with the surrounding environment. For instance, an operator has to instruct and inquire from a vehicle about interests regarding the surrounding environment. These requests and actions can distract operators, thereby reducing safety and frustrating driving experiences. Therefore, systems assisting occupants with interesting information about a surrounding environment have shortcomings that can negatively impact satisfaction and experiences for vehicle travel.

SUMMARY

In one embodiment, example systems and methods generating audiovisual and virtual content that are interesting to occupants about a geographic area during vehicle travel following adaptive timing are disclosed. In various implementations, systems assisting occupants during a drive with exploring and deeply experiencing geographic areas face challenges with supplying interesting and compelling information. For example, occupants are interested about facts regarding a building that are relevant to topics they find interesting, such as enjoyable establishments according to occupant preferences. Occupants may also wish to learn more than the facts concerning a surrounding area. For instance, occupants find the visual history of the surrounding area interesting which is difficult to communicate and interact with textual and auditory outputs. In other words, systems creating data about a surrounding area lack interactive features and overly rely on passive data (e.g., textual data, auditory data, etc.), thereby forgoing experiences that are immersive and entertaining during vehicle travel.

Therefore, in one embodiment, an interactive system supplying options for occupants within a vehicle to interact with a geographic area surrounding a vehicle using virtual reality (VR) and minimal search inputs during vehicle travel is disclosed. Furthermore, the interactive system can generate virtual information that overlays a historical view for the occupants and mimic traveling through time using augmented reality (AR) accordingly. Regarding creating an immersive experience using VR, the interactive system can generate audiovisual content of a view using a time sequence as a commentary mode. Here, the audiovisual content can be interactive commentary and narration about the geographic area. In one approach, the interactive commentary is directed towards location and objects relevant to the occupants identified by the interactive system. The time sequence can involve asynchronously converting the view on a windshield display, a window display, etc., while the vehicle travels and reverting to a current view by fast-forwarding the view. In this way, the interactive system seamlessly transitions out of commentary mode through adapting the time sequence.

In various implementations, in one embodiment, the interactive system generates an immersive experience using AR in a mode for time-travel. Here, occupants can virtually travel through time within a vehicle using historical photos, audio outputs, and scents. For instance, the occupants can request that a view on a windshield display changes to various time periods in history concerning the geographic area. The interactive system processes the request by accessing actual media (e.g., pictures, videos, etc.) of the geographic area from a database and overlays the media upon an object (e.g., a building) within the view using AR on the windshield display. In one approach, a machine learning (ML) model develops the historical changes in an audiovisual form upon a search by the interactive system indicating that acquisition of the historical changes is unavailable. Accordingly, an interactive system generates an immersive experience during vehicle travel that is rich through narration and virtual information, thereby improving occupant satisfaction and entertainment.

In one embodiment, an interactive system for generating audiovisual and virtual content that are interesting to occupants about a geographic area during vehicle travel following adaptive timing is disclosed. The interactive system includes a memory storing instructions that, when executed by a processor, cause the processor to detect features about an area surrounding a vehicle during vehicle travel using sensor data. The instructions also include instructions to transition a mode for the vehicle using the features and occupant parameters. The instructions also include instructions to generate audiovisual content and virtual information of a view within the area for the mode using a time sequence. The instructions also include instructions to adapt an environment of the vehicle using the audiovisual content, the virtual information, and the occupant parameters.

In one embodiment, a non-transitory computer-readable medium for generating audiovisual and virtual content that are interesting to occupants about a geographic area during vehicle travel following adaptive timing and including instructions that when executed by a processor cause the processor to perform one or more functions is disclosed. The instructions include instructions to detect features about an area surrounding a vehicle during vehicle travel using sensor data. The instructions also include instructions to transition a mode for the vehicle using the features and occupant parameters. The instructions also include instructions to generate audiovisual content and virtual information of a view within the area for the mode using a time sequence. The instructions also include instructions to adapt an environment of the vehicle using the audiovisual content, the virtual information, and the occupant parameters.

In one embodiment, a method for generating audiovisual and virtual content that are interesting to occupants about a geographic area during vehicle travel following adaptive timing is disclosed. In one embodiment, the method includes detecting features about an area surrounding a vehicle during vehicle travel using sensor data. The method also includes transitioning a mode for the vehicle using the features and occupant parameters. The method also includes generating audiovisual content and virtual information of a view within the area for the mode using a time sequence. The method also includes adapting an environment of the vehicle using the audiovisual content, the virtual information, and the occupant parameters.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
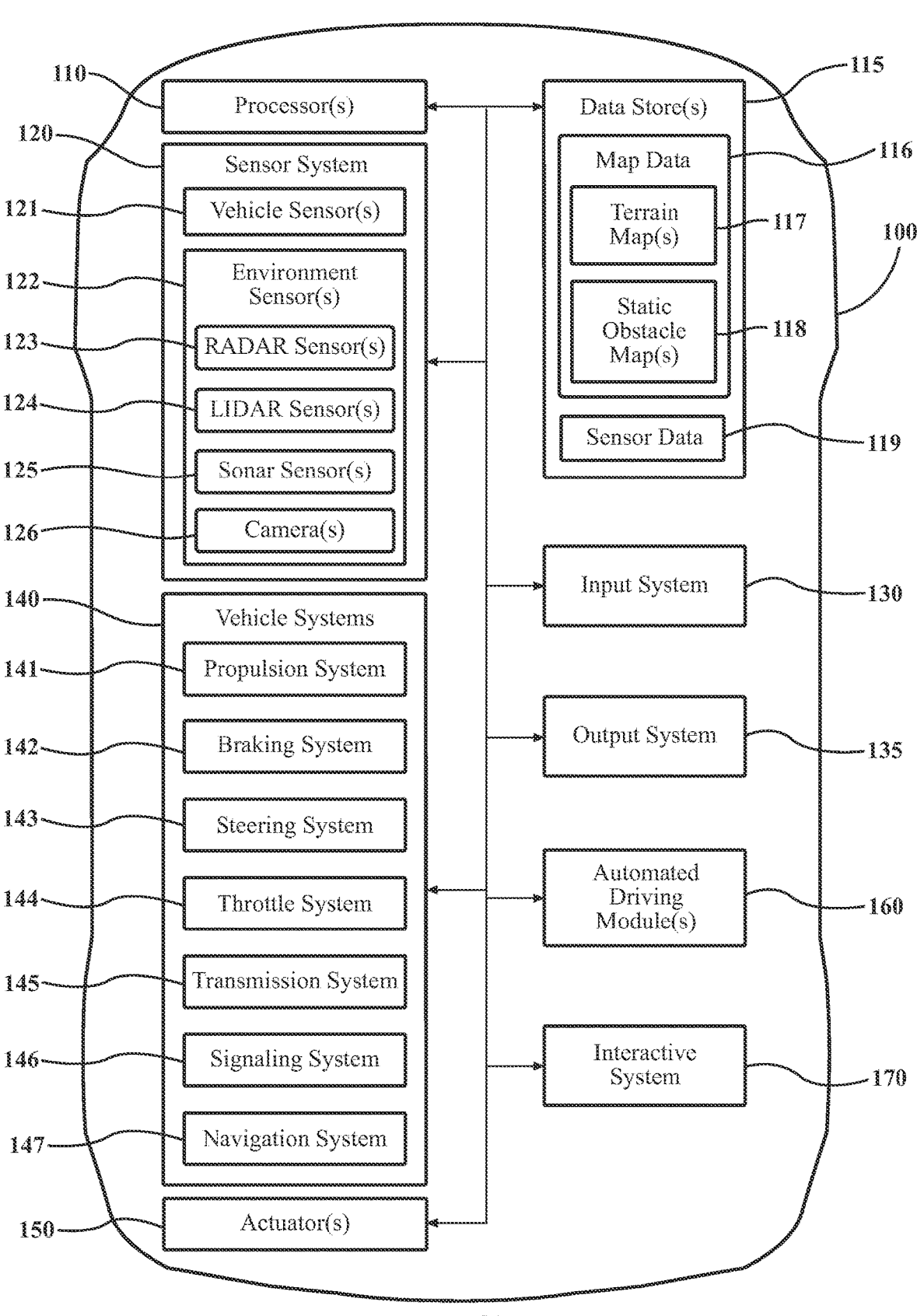
FIG. 1 illustrates one embodiment of a vehicle within which systems and methods disclosed herein may be implemented.

Systems, methods, and other embodiments associated with generating audiovisual and virtual content that are interesting to occupants about a geographic area during vehicle travel using adaptive timing are disclosed herein. In various implementations, systems that enhance experiences during vehicle travel misinterpret occupant interests about topics within a geographic area. For instance, a vehicle traveling within a new town misses opportunities for automatically recommending and describing establishments that fit occupant interests. Instead, systems may make general recommendations and request feedback from vehicle occupants for guidance that causes distraction from other tasks and takes time to identify facts. Furthermore, systems may find describing historical information about a scene difficult through passive channels (e.g., textual data, auditory data, etc.). As such, vehicle occupants miss opportunities to appreciate and understand historical significance when traveling through the geographic area.

Therefore, in one embodiment, an interactive system includes various interactive modes for narration and time-travel within a vehicle through automatically generating audiovisual and virtual content that are interesting to occupants. For example, a narration mode generates interesting facts (e.g., film locations, relevant stores, etc.), history, and a story about a geographic area being visited by the vehicle using virtual reality (VR) and adaptive timing. Here, the interactive system transitions to the narration mode using features detected about the geographic area using sensor data and occupant parameters (e.g., historical interests, entertainment interests, etc.). In one approach, the view on a windshield display, a window display, etc., can adjust and change to create a tour having a virtual assistant through adaptive timing. This can involve varying a time sequence through video acceleration and deceleration for an asynchronous experience. For instance, the view during the narration mode represents a recently past section of the geographic area. The vehicle converts to a current view through fast-forwarding images and video on the display(s), such as by blurring or fading in the current view. In this way, the interactive system generates a virtual environment within the narration mode where vehicle occupants experience the geographic area without missing action and disrupting vehicle travel.

In various implementations, the interactive system includes a mode for virtually traveling through time while in a geographic area. Here, the mode allows vehicle occupants to experience the evolution of the geographic area through augmented reality (AR) and mixed reality that changes a view on the display(s), such as through following a time sequence (e.g., a time period, a timeline, etc.). In one approach, the interactive system suggests another geographic area, acquires information, or generates information about times through a machine learning (ML) model when the information is otherwise unavailable. For example, the ML model interpolates two-dimensional (2D) historical images of a time related with the geographic area and creates a wireframe by splicing the 2D images. The ML model can overlay and align a 3D representation using the wireframes for objects in a view seen through the display(s). Accordingly, the interactive system forms an immersive and entertaining experience for vehicle occupants using narration and virtual modes, thereby improving travel enjoyment and occupant satisfaction.

Now referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an interactive system 170 uses road-side units (RSU), consumer electronics (CE), mobile devices, robots, drones, and so on that benefit from the functionality discussed herein associated with generating audiovisual and virtual content that are interesting to occupants about a geographic area using adaptive timing.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an interactive system 170 that is implemented to perform methods and other functions as disclosed herein relating to generating audiovisual and virtual content that are interesting to occupants about a geographic area using adaptive timing. As will be discussed in greater detail subsequently, the interactive system 170, in various embodiments, is implemented partially within the vehicle 100, and as a cloud-based service. For example, in one approach, functionality associated with at least one module of the interactive system 170 is implemented within the vehicle 100 while further functionality is implemented within a cloud-based computing system. Furthermore, the examples given may reference displaying audiovisual content on windshield displays. However, the audiovisual content can be displayed on other surfaces such as window displays, see-through displays, etc., as understood by one of ordinary skill in the art.

Figure 2:
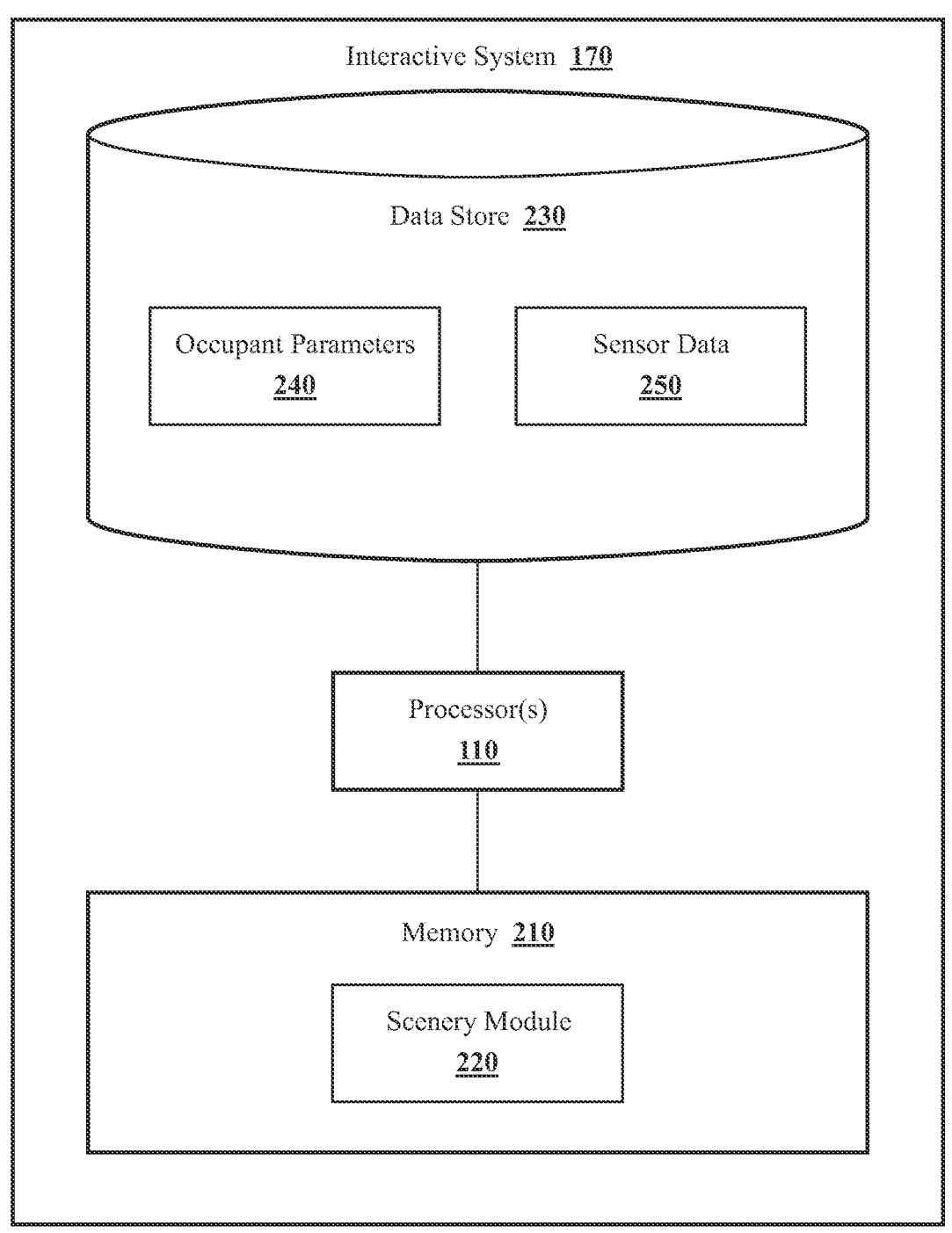
FIG. 2 illustrates one embodiment of an interactive system that is associated with generating audiovisual and virtual content that are interesting to occupants about an area following adaptive timing.

With reference to FIG. 2, one embodiment of the interactive system 170 of FIG. 1 is further illustrated. The interactive system 170 is shown as including a processor(s) 110 from the vehicle 100 of FIG. 1. Accordingly, the processor(s) 110 may be a part of the interactive system 170, the interactive system 170 may include a separate processor from the processor(s) 110 of the vehicle 100, or the interactive system 170 may access the processor(s) 110 through a data bus or another communication path. In one embodiment, the interactive system 170 includes a memory 210 that stores a scenery module 220. The memory 210 is a random-access memory (RAM), a read-only memory (ROM), a hard-disk drive, a flash memory, or other suitable memory for storing the scenery module 220. The scenery module 220 is, for example, computer-readable instructions that when executed by the processor(s) 110 cause the processor(s) 110 to perform the various functions disclosed herein.

As explained below, the interactive system 170 as illustrated in FIG. 2 is generally an abstracted form of the interactive system 170 as may be implemented between the vehicle 100 and a cloud-computing environment. Furthermore, the scenery module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the scenery module 220, in one embodiment, acquires sensor data 250 that includes at least camera images that the interactive system 170 processes to estimate eye, head position, gaze, etc., of occupants. In further arrangements, the interactive system 170 acquires the sensor data 250 from further sensors such as radar sensors 123, LIDAR sensors 124, and other sensors as may be suitable for identifying vehicles and locations of the vehicles.

Accordingly, the scenery module 220, in one embodiment, controls the respective sensors to provide the data inputs in the form of the sensor data 250. Additionally, while the scenery module 220 is discussed as controlling the various sensors to provide the sensor data 250, in one or more embodiments, the scenery module 220 can employ other techniques to acquire the sensor data 250 that are either active or passive. For example, the scenery module 220 may passively sniff the sensor data 250 from a stream of electronic information provided by the various sensors to further components within the vehicle 100. Moreover, the scenery module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors. For instance, the sensor data 250 includes information about lane markings, locations of surrounding vehicles, etc.

Moreover, in one embodiment, the interactive system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the scenery module 220 in executing various functions. In one embodiment, the data store 230 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the data store 230 further includes the occupant parameters 240 that may specify one of historical interests, entertainment interests, literary interests, physiological responses, etc. In one approach, the interactive system 170 receives and forms the occupant parameters 240 in an auditory form, thereby foregoing reliance upon textual inputs.

Figure 3:
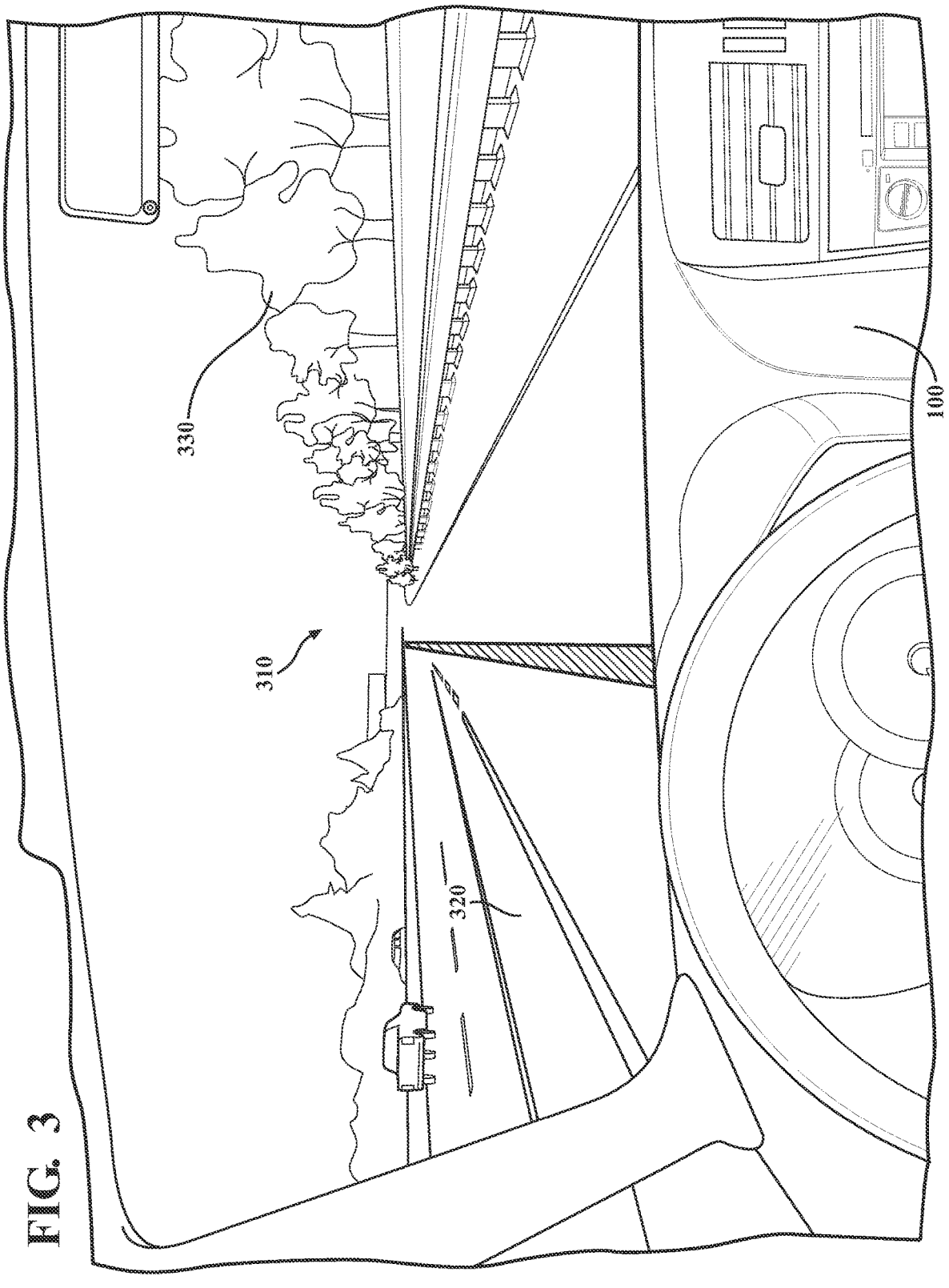
FIG. 3 illustrates one example of an area surrounding a vehicle having audiovisual and virtual content generated by the interactive system that are interesting to occupants.

Turning to FIG. 3, one embodiment of an area 310 geographically surrounding the vehicle 100 having audiovisual and virtual content generated by the interactive system that are interesting to occupants is illustrated. The scenery module 220, in one embodiment, is further configured to perform additional tasks beyond controlling the respective sensors to acquire and provide the sensor data 250. For example, the interactive system 170 and the scenery module 220 include instructions that cause the processor 110 to detect features (e.g., landmarks, buildings, foliage, sites, etc.) about an area surrounding the vehicle 100 during vehicle travel using the sensor data 250 and vision model (e.g., SAM, You Only Look Once (YOLO), etc.). As further explained below, the vehicle 100 may transition to a mode using the features and occupant parameters and the interactive system 170 generates audiovisual content and virtual information of a view within the area using a time sequence. Ultimately, the scenery module 220 can adapt an environment of the vehicle 100 using one of the audiovisual content, the virtual information, and the occupant parameters.

The modes available to the occupants may include one of narration mode, commentary mode, virtual mode, time-travel mode, etc. The interactive system 170 within the vehicle 100 (e.g., a connected and automated vehicle (CAV)) can automatically recommend the narration mode when traveling through a geographic area that the occupants may find interesting, such using the sensor data 250, map data, etc. An occupant can also prompt the interactive system 170 to enter the narration mode when they are in a geographic area having surroundings that the occupant finds interesting. For example, interesting information can be the occupant parameters 240 that include one of exciting facts, shopping data, a history about the surroundings, a story about the geographic area, entertainment-related information, establishments relevant to the occupant, etc. Examples of the entertainment-related information include television shows, movies, books, etc., filmed at the geographic area, describing the geographic area, etc. In one approach, the interactive system 170 can produce interactive commentary and narration about an interesting object using the sensor data 250 and map data about the geographic area factoring the interesting information and the occupant parameters 240.

In FIG. 3, the interactive system 170 can reproduce interactive narration and commentary using a virtual assistant while the vehicle 100 travels on the road 320. For example, an occupant commands the interactive system 170 to tell a story about an interesting object within the surroundings of the vehicle 100. The virtual assistant may be a persona, avatar, creature, etc., generated on a windshield display of the vehicle 100 using one of AR, mixed reality, and VR. The persona can be relevant to the geographic area. In one approach, the interactive system 170 forms the virtual assistant according to a character from a television show the occupant watches, designed by the occupants, etc. Regarding interactions, the occupant can command the virtual assistant to talk more about certain landmarks within a field-of-view of the occupants, ask the virtual assistant questions about the surroundings, etc.

Moreover, the virtual assistant can converse with the occupants using a ML. In one approach, the ML model uses a machine learning algorithm embedded within the scenery module 220, such as a convolutional neural network (CNN), to perform semantic segmentation over the sensor data 250 and occupant commands (e.g., auditory, sensory, gaze, textual, etc.) from which further information is derived. Of course, in further aspects, the ML model may employ different machine learning algorithms or implement different approaches for performing the associated functions, which can include deep convolutional encoder-decoder architectures, or another suitable approach that generates semantic labels for the separate object classes represented in images. In this way, the ML model generates relevant responses during a conversation and generates interactive experiences through imagery on a windshield display, a window display, etc., according to the occupant parameters 240.

In various implementations, the interactive system 170 generates the virtual tour on-demand with customizations for the occupant without intensive searching, thereby reducing travel distractions. Here, the interactive system 170 can generate a virtual reality window experience (VRWE) such that windows and windshields of the vehicle 100 display scenes that correspond with timing of outputted narration. For example, the virtual assistant generates a "mystery tour" that takes occupants to different nearby landmarks for a recently past geographic area through freezing or rewinding a view as described below. The interactive system 170 may also lead the vehicle 100 to a well-known restaurant, park, museum, etc. In one approach, the mystery tour includes interesting commentary along the tour generated according to the occupant parameters 240. In this case, the interaction with the environment excludes intensive input and search commands that avoid searching of media including one of text, pictures, videos, audio, images, etc. feedback, thereby improving user experience.

Regarding details about the interactive system 170 detecting the features about the geography within the area 310, the interactive system 170 can estimate physiological responses and arousals to objects by vehicle occupants and adapt a VR experience accordingly. Here, the physiological responses can include one of eye movement, eye tracking, gaze estimates, galvanic skin inputs, conversational response times, tone, audible sentiment, etc., for updating the occupant parameters 240. An interest level can be estimated using the physiological responses and high-definition map data for pin-pointing object locations. For example, the interactive system 170 detects while telling a history of a fire station that an occupant has eyes that are wide open and viewing the fire station. Furthermore, the occupant may also be scanning the doors, windows, vehicles inside, etc., of the fire station. As such, the interactive system 170 estimates that the occupant is engaged and excited about the current topic from the physiological response and continues talking about the fire station within a virtual scene generated with the VRWE. In one approach, the interactive system 170 expands information on the fire station using a virtual assistant according to an occupant command when pointing at an object while in the vehicle 100 detected with image data using camera(s) 126. However, the interactive system 170 switches focus of the VRWE from the fire station to trees 330 within the scene when detecting that the occupant is no longer engaged. For instance, the occupant is engaged and aroused by another building within the scene according to processed data from galvanic skin-response (GSR) sensors. In response, the interactive system 170 changes topics until finding a topic that is engaging, arousing, etc., for the occupant.

Regarding details about developing a time sequence for the VRWE, the interactive system 170 adjusts the time sequence using one of video acceleration and video deceleration for asynchronously viewing an environment upon the vehicle 100 changing a position. This can include converting the vehicle 100 to a current view of the area through fast-forwarding and accelerating a view presented on a windshield display, a window display, etc., of the vehicle 100. For example, the fast-forwarding blurs-in the current view from an image of an environment. In another example, the interactive system 170 detects from the occupant parameters 240 and the sensor data 250 that an occupant is viewing and pointing at a building while windshields, windows, etc., of the vehicle are displaying the current view.

Moreover, the interactive system 170 initiates the VRWE and narration mode by seamlessly transitioning from "real-windows" to "virtual-windows." Here, the virtual-windows show an image of a virtual environment that the occupant would have seen of a geographic area recently past (e.g., two minutes ago) by the vehicle 100. In one approach, the VRWE generates an asynchronous view by slowing down (e.g., 1/10th speed) and pausing the image being viewed in slowed-down time. This gives the effect that the vehicle 100 has slowed down. In reality, the vehicle 100 is actually proceeding on the road 320 using automated driving, assisted driving, etc. In this way, slowed-down visuals allow occupants to keep "looking" at the target while the narration system provides ample description. Upon completing the narrative description for the target, the interactive system 170 and the VRWE can fast-forward the view to catch up with the current view and then transition back to the real-window view. The interactive system 170 and the VRWE can blur-out and blur-back in the real-window for smoothing transitions and preventing jarring changes.

Figure 4:
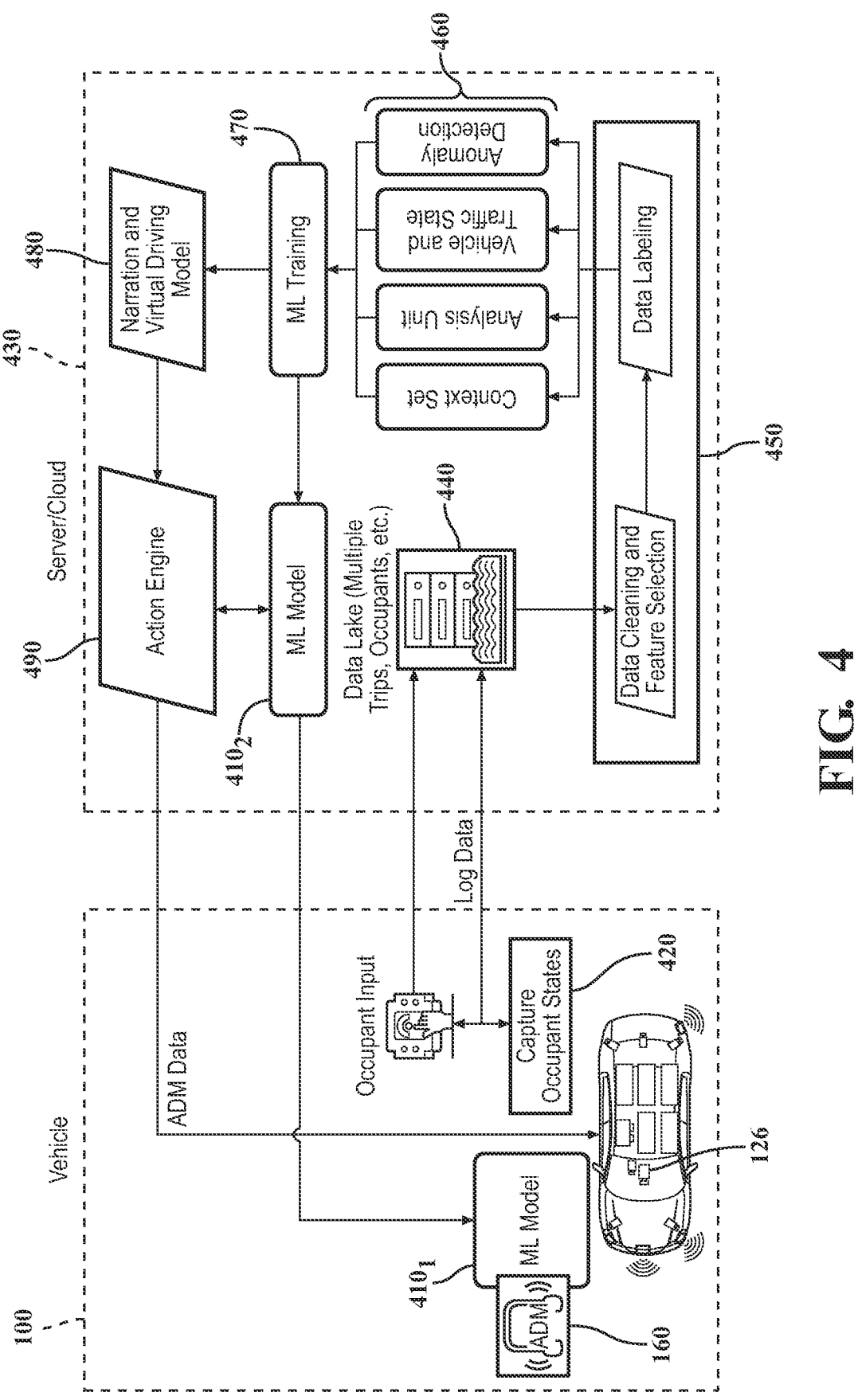
FIG. 4 illustrates one embodiment of an interactive system communicating with a remote system for generating audiovisual and virtual content that are interesting using models.

Now turning to FIG. 4, one embodiment of the interactive system 170 communicating with a remote system for generating audiovisual and virtual content that are interesting using models is illustrated. As explained below, the vehicle 100 includes a ML model 4101 that generates interactive environments with the interactive system 170. The vehicle 100 also includes front radar, corner, and camera(s) 126 that generate the sensor data 250 for forming the occupant parameters 240. The interactive system 170 can also capture occupant states 420 (e.g., physiological states) using occupant inputs and store the states within a logger(s) 1-5. The vehicle 100 can communicate log data from the logger(s) 1-5, occupant inputs, and the sensor data 250 to a server/cloud 430 having the data lake 440 that stores data from multiple trips, occupants, etc. Server/cloud 430 cleans and selects features (e.g., keypoints, boundaries, etc.) and labels data stored within the data lake 440 using processing stage 450. Eventually, remote processing 460 has a context set (e.g., highway travel, inexperienced operator, etc.), analysis results (e.g., correlations), vehicle and traffic states (e.g., congested road, parked vehicle, etc.), and anomaly detection (e.g., animal crossing, sudden weather change, etc.) that structures and organizes the labeled data for ML training 470.

In FIG. 4, the ML training 470 can provide weights and parameters to adjust a ML model 4102 and a narration and virtual driving model 480. As explained below, an action engine 490 can create new virtual environments and augment environments using wireframing and output path plans. For instance, the server/cloud 430 communicates automated driving module (ADM) data to the vehicle 100 that includes path plans associated with a virtual tour, such as within the narration mode. After training, the interactive system 170 replaces the ML model 4101 with ML model 4102 which is trained with the log data, occupant inputs, the sensor data 250, etc.

Forthcoming are examples describing a mode for virtually traveling through time associated with a geographic area. An occupant requests that the vehicle 100 (e.g., a CAV) enter a mode for virtual time-travel using a human-machine interface (HMI), voice activation, etc. The request can include a time sequence such as one of a date (e.g., 100 years ago), time-of-day, and timeline about the geographic area that the vehicle 100 is currently traveling through. When requesting the timeline, the occupant may request a speed at which changes over the timeline are presented by the interactive system 170. For example, an occupant requests virtualizations of changes for a geographic area since 1950 over a two-minute period. Furthermore, in one approach, an occupant can ask questions, such as "How has this building changed since original construction?," "Has this tree always been here?," etc., rather than selecting a specific date. Subsequently, the interactive system 170 produces historical changes about the geographic area using AR on a windshield display of the vehicle 100 including interactive data that is virtual.

In various implementations, the interactive system 170 estimates the interactive environment using a ML model according to the occupant parameters 240 and incorporates interactive data for an immersive experience, such as through incorporating multi-modalities. Here, the interactive data can include one of audible questions, scents associated with the historical changes, and damping sounds for the area. For example, the interactive system 170 estimates modalities for sounds and smells of horses in the 1850s using geotagged and time-stamped videos posted on the Internet during the mode for time-travel. In this way, the interactive system 170 enhances virtually traveling by augmenting senses and adding actions to AR views.

In various implementations, the interactive system 170 searches and acquires the historical changes from a local database, a remote database, the Internet, etc., and renders an AR environment for interesting objects within a view. The historical changes can be presented using a perspective and current position of the vehicle 100. For example, the interactive system 170 overlays images, videos, etc., associated with the historical changes that correspond to the exact location of the building through the windshield from the perspective of a frontal view. In one approach, the interactive system 170 performs the overlay by identifying relevant objects in the vicinity of the vehicle 100 using image recognition, edge detection techniques, etc., and aligns the historical changes accordingly. Furthermore, in one arrangement, the interactive system 170 processes the sensor data 250 associated with the eye position, head position, gaze, etc., of an occupant and aligns visuals to the perspective accordingly. For example, the interactive system 170 overlays the historical changes in a manner allowing the occupant to see a time-lapse of the environment from distinct viewing angles.

The search for certain historical changes may indicate acquiring existing information is unattainable. For example, pictures of certain areas in the field-of-view are unavailable for a time period or video missing from a certain date along a timeline. Here, the interactive system 170 informs the occupant of the historical changes available and presents the occupant with information, such as fun facts about the requested time period. The interactive system 170 can also suggest another time period having available interesting data according to the occupant parameters 240. In one embodiment, the interactive system 170 suggests a "hotspot" for the vehicle 100 and the occupant to explore, such as by factoring the occupant parameters 240. A hotspot may be a location that has an ample amount of image data, video data, etc., associated with the location. As such, the occupant is directed to a geographic area allowing for virtual time-traveling that otherwise is unattainable.

In another approach, the interactive system 170 develops and recreates using the ML model (e.g., a neural network) the historical changes in an audiovisual form for an AR environment according to detected features about a geographic area surrounding the vehicle 100. This action can be responsive to a search indicating that the acquisition is unavailable. Here, the ML model interpolates 2D images about an object within the geographic area surrounding the vehicle 100 for the recreation. The 2D image can be existing historical images, historical datasets, and other historical information associated with the environment (e.g., the weather, existing buildings, existing landmarks, etc.). The interactive system 170 can create a wireframe using the ML model by splicing the 2D images and form a 3D representation of the object using the wireframe for a time period. Similar to the prior approaches, the interactive system 170 overlays and aligns the 3D representation within the view and the AR environment on the windshield display, the window display, etc. The aligning can involve factoring a speed of the vehicle 100 for reducing offsets and distortion when inserting the 3D representation. An enhancement may also involve narration of historical information during the time-travel, such as with an avatar. In this way, the ML model develops historical changes as images, videos, etc., of the surroundings would have looked like for time-travel mode.

Regarding additional features, the interactive system 170 outputs a time lapse of pictures exhibiting how the surroundings have changed over a requested timeline. Besides visual changes, the interactive system 170 and the ML model can predict sounds and scents associated with the time point. For example, nature sounds and an evergreen scent are generated when displaying historical changes for time points requested by the occupant when the vehicle 100 is near a nature park with evergreen trees. In one approach, the interactive system 170 may mask ambient environmental noise using in-vehicle audio outputs that allow occupants to imagine traveling back in time rather than hearing background noise from the current environment. Accordingly, the interactive system 170 generates an immersive environment using VR and AR for creating travel modes and a time sequence that are unique.

Moreover, the interactive system 170 and the scenery module 220 can generate multiple AR views that are customized for splitting environments during virtual time-travel. For example, a first occupant shows interest in a police station according to the occupant parameters 240 indicating interest for police shows. Processing of the sensor data 250 using computer vision also indicates that the first occupant may be focusing on the police station. In response, the interactive system 170 generates virtual information using AR on the nearest window, windshield display, etc., exhibiting the police station from 50 years ago for the first occupant. Meanwhile, other occupants in the vehicle 100 see a present view of surrounding areas or a customized view similar to the approach implemented for the first occupant. Thus, the interactive system 170 can customize audiovisual content and virtual information of views on an occupant basis, thereby enhancing and improving travel enjoyment.

Figure 5:
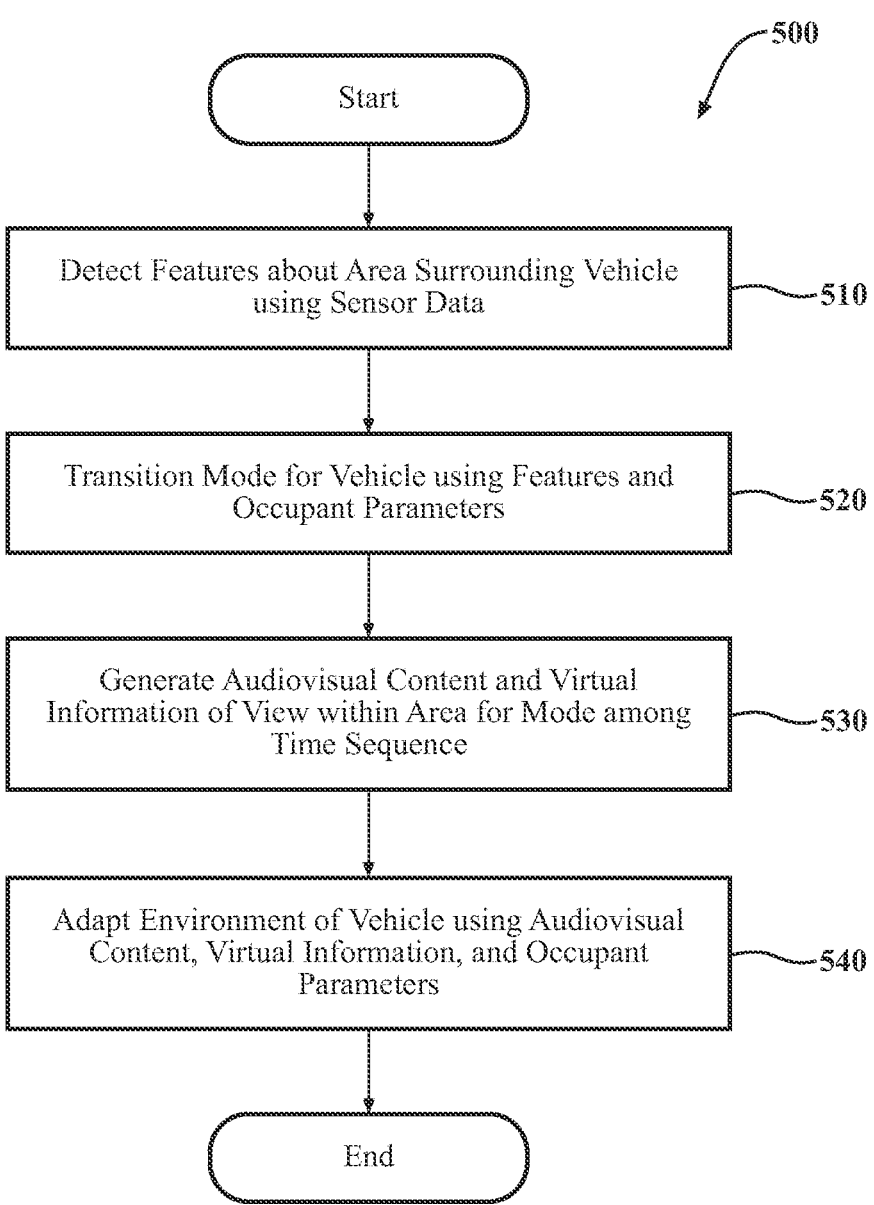
FIG. 5 illustrates one embodiment of a method that is associated with generating audiovisual content and virtual information of a scene following a mode and time sequence to adapt a vehicle environment.

Regarding FIG. 5, a flowchart of a method 500 that is associated with generating audiovisual content and virtual information of a scene following a mode and time sequence to adapt a vehicle environment is illustrated. Method 500 will be discussed from the perspective of the interactive system 170 of FIGS. 1 and 2. While method 500 is discussed in combination with the interactive system 170, it should be appreciated that the method 500 is not limited to being implemented within the interactive system 170 but is instead one example of a system that may implement the method 500.

At 510, the interactive system 170 detects features about an area surrounding (e.g., a geographic area) the vehicle 100 using the sensor data 250. Here, the sensor data 250 can include information from radar sensors 123, LIDAR sensors 124, camera images, etc. For example, the interactive system 170 can process the camera images to estimate eye, head position, gaze, etc., of occupants. Regarding feature detection, as previously explained, the interactive system 170 can detect features (e.g., landmarks, buildings, foliage, sites, etc.) using a vision model (e.g., YOLO).

At 520, the interactive system 170 transitions a mode for the vehicle 100 using the features and the occupant parameters 240. Here, the mode may be one of a narration mode, a mode for virtual time-travel, etc. As previously explained, the interactive system 170 within the vehicle 100 can automatically recommend the narration mode when traveling through the area that the occupants may find interesting, such as using the sensor data 250, map data, etc., and assemble a time sequence that virtually pauses views seen by an occupant. The mode for virtual time-travel can recreate a time sequence (e.g., date, time-of-day, a timeline, etc.) of the area that the vehicle 100 is currently located, such as through voice commands. Regarding the occupant parameters 240, the interactive system 170 derives the occupant parameters 240 that indicate interest from the sensor data 250 and other data. Exemplary interests can include historical interests, entertainment interests, literary interests, etc. Furthermore, the interests can include one of exciting facts, shopping data, a history about the surroundings, a story about a geographic area, establishments relevant to the occupant, etc. The mode of virtual time-travel can combine the occupant parameters 240 having audio such as "What did that police station look like 50 years go?" and the sensor data 250 such as a gaze towards the police station.

In various implementations, the interactive system 170 detects the features about geographic areas surrounding the vehicle 100 through estimating physiological responses and arousals to objects by vehicle occupants. Here, the physiological responses can include one of eye movement, eye tracking, gaze estimates, galvanic skin inputs, conversational response times, tone, audible sentiment, etc., for updating the occupant parameters 240. As previously explained, an interest level can be estimated using the physiological responses and high-definition map data for pin-pointing locations of objects. As such, the interactive system 170 estimates that the occupant is engaged and excited about the current topic from the physiological response and continues information outputs about the topic within a virtual scene generated with the VRWE. In one approach, the interactive system 170 expands information on the topic using a virtual assistant according to an occupant command when pointing at an object while within the vehicle 100 detected with image data using camera(s) 126. Correspondingly, the interactive system 170 switches focus of the VRWE from the topic to other objects within when detecting that the occupant is no longer engaged with the topic. For instance, the occupant is instead engaged and aroused by another building within the scene according to processed data from GSR sensors.

At 530, the interactive system 170 generates audiovisual content and virtual information of a view within an area for the mode among a time sequence. During the narration mode, the interactive system 170 can transition back and forth between real-time and VR views, asynchronously and seamlessly. In this way, visuals that jar and distract occupants are avoided. As previously explained, the interactive system 170 can generate a VRWE such that windows and windshields of the vehicle 100 display scenes associated with the timing of outputted narration, the audiovisual content, etc. In one approach, the VRWE includes an avatar created according to the occupant parameters 240 that narrates stories about objects within the area that the occupant would find fascinating.

Additionally, the interactive system 170 can search and acquire virtual information about the area for creating the AR environment during the mode for time-travel. The search for the virtual information may indicate that the acquisition is unavailable. As such, the interactive system 170 prompts the occupant about the unavailability and presents information, such as fun facts about the requested time period or suggests another time period having available data. In one embodiment, the interactive system 170 suggests a "hotspot" for the occupant to explore geographically. The hotspot may be a location having an ample amount of image data, video data, etc., associated with the location, thereby giving the occupant an alternative option for time-travel.

As previously explained, in another approach, the interactive system 170 recreates using the ML model (e.g., a neural network) the virtual information in an audiovisual form upon a search indicating that the acquisition is unavailable. For example, the ML model interpolates 2D images about an object within the area for the recreation. The 2D image can be existing historical images, historical datasets, etc., associated with the environment (e.g., the weather, existing buildings, existing landmarks, etc.). The interactive system 170 creates a wireframe using the ML model by splicing the 2D images and forms a 3D representation of the object using the wireframe.

At 540, the scenery module 220 adapts the environment of the vehicle 100 using the audiovisual content, the virtual information, and the occupant parameters 240. During narration mode, the interactive system 170 and the scenery module 220 adjust the time sequence using one of video acceleration, fast-forwarding, video deceleration, rewinding, etc., for asynchronously viewing an environment upon the vehicle 100 changing a position. A virtual scene can be presented by pausing the current view during travel and displaying a recent view (e.g., two minutes ago) using video deceleration. The vehicle 100 also adapts and converts to the current view through fast-forwarding and accelerating a view presented on a windshield display. Here, fast-forwarding can involve blurring-in the current view from an image of the surroundings. For example, the interactive system 170 detects from the occupant parameters 240 and the sensor data 250 that an occupant is viewing and pointing at an interesting building while see-through displays of the vehicle are displaying the current view. The interactive system 170 initiates the windshield and window displays and switches to narration mode by seamlessly transitioning from "real-windows" to "virtual-windows." In this way, the virtual-windows can show an image of a virtual environment including the area recently passed by the vehicle 100.

Moreover, in one embodiment, the windshield display, window display, etc., generates an asynchronous view by slowing down and pausing an image using a slowed timeframe. This gives the effect that the vehicle 100 has slowed down when the vehicle 100 is actually moving on a current road, such as with commands from automated driving module(s) 160. As such, slowed-down visuals allow occupants to keep "looking" at the target.

Regarding virtual mode, the scenery module 220 can present the virtual information using a perspective and current position of the vehicle 100. For example, the interactive system 170 overlays images, videos, etc., associated with the virtual information that correspond to the exact location of the building through a windshield display, a window display, etc., from the perspective of front views. In one approach, the interactive system 170 performs the overlay by identifying relevant objects in the vicinity of the vehicle 100 using image recognition, edge detection techniques, etc., and aligns the historical changes accordingly. Furthermore, in one arrangement, the interactive system 170 processes the sensor data 250 associated with the eye position, head position, gaze, etc., of an occupant and aligns visuals to the perspective accordingly. Here, the aligning can involve factoring a speed of the vehicle 100 for reducing offsets and distortion when inserting the 3D representation. Accordingly, the interactive system 170 creates audiovisual content and virtual information of the area for various modes that accurately simulate touring and time-travel for immersive experiences, thereby improving vehicle travel.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the interactive system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the interactive system 170, and/or the automated driving module(s) 160 may control some or all of the vehicle systems 140 and, thus, may be partially or fully autonomous as defined by the society of automotive engineers (SAE) levels 0 to 5.

The processor(s) 110, the interactive system 170, and/or the automated driving module(s) 160 can be operatively connected to communicate with the various vehicle systems 140 and/or individual components thereof. For example, the processor(s) 110, the interactive system 170, and/or the automated driving module(s) 160 can be in communication to send and/or receive information from the various vehicle systems 140 to control the movement of the vehicle 100. The processor(s) 110, the interactive system 170, and/or the automated driving module(s) 160 may control some or all of the vehicle systems 140.

The processor(s) 110, the interactive system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the interactive system 170, and/or the automated driving module(s) 160 can control the direction and/or speed of the vehicle 100. The processor(s) 110, the interactive system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the interactive system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5 but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An interactive system comprising:
a processor and a memory storing instructions that, when executed by the processor, cause the processor to:
detect features about an area surrounding a vehicle during vehicle travel using sensor data;
transition a mode for the vehicle using the features and occupant parameters;
generate audiovisual content and virtual information of a view within the area for the mode using a time sequence;

adapt an environment on an exterior view of the vehicle using the audiovisual content, the virtual information, and the occupant parameters; and adjust the time sequence using one of video acceleration and video deceleration for asynchronously viewing the environment upon the vehicle changing a position.

2. The interactive system of claim 1, wherein the instructions to generate the audiovisual content and the virtual information of the view further include instructions to:

identify a location of an object within the area according to the occupant parameters, wherein the occupant parameters specify one of historical interests, entertainment interests, and literary interests received in an auditory form;

produce interactive commentary and interactive narration about the object using the sensor data and map data about the area; and reproduce by the vehicle the interactive commentary and the interactive narration using a virtual assistant according to an occupant command.

3. The interactive system of claim 1, wherein the instructions to generate the audiovisual content and the virtual information of the view further include instructions to:

receive a request to virtually experience one of a date, time-of-day, and timeline about the area; and produce historical changes about the area using augmented reality (AR) on a windshield display of the vehicle, wherein the historical changes include interactive data that is virtual and the mode is time-travel, and the exterior view includes one of the windshield display and a window display.

4. The interactive system of claim 3 further including instructions to:

estimate the interactive data using a machine learning (ML) model according to the occupant parameters, wherein the interactive data includes one of audible questions, scents associated with the historical changes, and damping sounds for the area; and the time sequence specifies a replay period of the historical changes for the area, and the replay period utilizes one of the video acceleration and the video deceleration.

5. The interactive system of claim 3 further including instructions to:

upon a search indicating that acquisition of the historical changes is unavailable, develop by a machine learning (ML) model the historical changes in an audiovisual form according to the features;

interpolate two-dimensional (2D) images by the ML model about an object within the area;

create a wireframe using the ML model by splicing the 2D images;

form a three-dimensional (3D) representation of the object by the ML model using the wireframe; and overlay and align the 3D representation within the view and the environment on the windshield display.

6. The interactive system of claim 1 further including instructions to:

convert the vehicle to a current view of the area through fast-forwarding the view presented on a windshield display of the vehicle, wherein the fast-forwarding includes blurring-in the current view from an image of the environment, and the exterior view includes one of the windshield display and a window display.

7. The interactive system of claim 1, wherein the instructions to detect the features about the area further include instructions to:

estimate physiological responses and arousals to objects within the area by vehicle occupants, wherein the physiological responses include one of eye movement, gaze estimates, galvanic skin inputs, conversational response times, tone, and audible sentiment; and update the occupant parameters using the physiological responses.

8. The interactive system of claim 1 further including instructions to:

interact with the environment without input and search commands from vehicle occupants using the occupant parameters, wherein the input is associated with media including one of pictures, videos, audio, and images.

9. The interactive system of claim 1, wherein the environment is one of a virtual reality environment for the audiovisual content and an augmented reality environment for the virtual information.

10. A non-transitory computer-readable medium comprising: instructions that when executed by a processor cause the processor to:

detect features about an area surrounding a vehicle during vehicle travel using sensor data;

transition a mode for the vehicle using the features and occupant parameters;

generate audiovisual content and virtual information of a view within the area for the mode using a time sequence;

adapt an environment on an exterior view of the vehicle using the audiovisual content, the virtual information, and the occupant parameters; and adjust the time sequence using one of video acceleration and video deceleration for asynchronously viewing the environment upon the vehicle changing a position.

11. The non-transitory computer-readable medium of claim 10, wherein the instructions to generate the audiovisual content and the virtual information of the view further include instructions to:

identify a location of an object within the area according to the occupant parameters, wherein the occupant parameters specify one of historical interests, entertainment interests, and literary interests received in an auditory form;

produce interactive commentary and interactive narration about the object using the sensor data and map data about the area; and reproduce by the vehicle the interactive commentary and the interactive narration using a virtual assistant according to an occupant command.

12. A method comprising:

detecting features about an area surrounding a vehicle during vehicle travel using sensor data;

transitioning a mode for the vehicle using the features and occupant parameters;

generating audiovisual content and virtual information of a view within the area for the mode using a time sequence;

adapting an environment on an exterior view of the vehicle using the audiovisual content, the virtual information, and the occupant parameters; and adjusting the time sequence using one of video acceleration and video deceleration for asynchronously viewing the environment upon the vehicle changing a position.

13. The method of claim 12, wherein generating the audiovisual content and the virtual information of the view further includes:

identifying a location of an object within the area according to the occupant parameters, wherein the occupant parameters specify one of historical interests, entertainment interests, and literary interests received in an auditory form;

producing interactive commentary and interactive narration about the object using the sensor data and map data about the area; and reproducing by the vehicle the interactive commentary and the interactive narration using a virtual assistant according to an occupant command.

14. The method of claim 12, wherein generating the audiovisual content and the virtual information of the view further includes:

receiving a request to virtually experience one of a date, time-of-day, and timeline about the area; and producing historical changes about the area using augmented reality (AR) on a windshield display of the vehicle, wherein the historical changes include interactive data that is virtual and the mode is time-travel, and the exterior view includes one of the windshield display and a window display.

15. The method of claim 14 further comprising:

estimating the interactive data using a machine learning (ML) model according to the occupant parameters, wherein the interactive data includes one of audible questions, scents associated with the historical changes, and damping sounds for the area; and the time sequence specifies a replay period of the historical changes for the area, and the replay period utilizes one of the video acceleration and the video deceleration.

16. The method of claim 14 further comprising:

upon a search indicating that acquiring the historical changes is unavailable, developing by a machine learning (ML) model the historical changes in an audiovisual form according to the features;

interpolating two-dimensional (2D) images by the ML model about an object within the area;

creating a wireframe using the ML model by splicing the 2D images;

forming a three-dimensional (3D) representation of the object by the ML model using the wireframe; and overlaying and aligning the 3D representation within the environment on the windshield display.

17. The method of claim 12 further comprising:

converting the vehicle to a current view of the area through fast-forwarding the view presented on a windshield display of the vehicle, wherein the fast-forwarding includes blurring-in the current view from an image of the environment, and the exterior view includes one of the windshield display and a window display.

18. The method of claim 12, wherein detecting the features about the area further includes:

estimating physiological responses and arousals to objects within the area by vehicle occupants, wherein the physiological responses include one of eye movement, gaze estimates, galvanic skin inputs, conversational response times, tone, and audible sentiment; and updating the occupant parameters using the physiological responses.

19. The method of claim 12 further comprising:

interacting with the environment without input and search commands from vehicle occupants using the occupant parameters, wherein the input is associated with media including one of pictures, videos, audio, and images.

20. The method of claim 12, wherein the environment is one of a virtual reality environment for the audiovisual content and an augmented reality environment for the virtual information.

* * * * *